(12) United States Patent
Vlahos et al.

(10) Patent No.: US 6,361,173 B1
(45) Date of Patent: Mar. 26, 2002

(54) METHOD AND APPARATUS FOR INHIBITING PROJECTION OF SELECTED AREAS OF A PROJECTED IMAGE

(75) Inventors: Paul Vlahos, Tarzana; Arpag Dadourian, Northridge; Petro Vlahos, Lake Hughes, all of CA (US)

(73) Assignee: iMatte, Inc., Chatsworth, CA (US)

( * ) Notice: Subject to any disclaimer, the term of this patent is extended or adjusted under 35 U.S.C. 154(b) by 0 days.

(21) Appl. No.: 09/788,026

(22) Filed: Feb. 16, 2001

(51) Int. Cl.[7] ............................................... G03B 21/00
(52) U.S. Cl. ......................................... 353/97; 353/122
(58) Field of Search ............................. 353/122, 28, 97; 348/586, 590, 607

(56) References Cited

U.S. PATENT DOCUMENTS 5,270,820 A * 12/1993 Fellinger
5,912,700 A * 6/1999 Honey et al. ................ 348/157
5,913,591 A * 6/1999 Melville ....................... 353/28
5,971,544 A * 10/1999 Perry ........................... 353/28
6,252,632 B1 * 6/2001 Cavallaro .................... 348/585

* cited by examiner

Primary Examiner—William Dowling
(74) Attorney, Agent, or Firm—Blakely Sokoloff Taylor & Zafman

(57) ABSTRACT

A video projector shows the desired scene on a projection screen. An infrared source close to the video projector uniformly floods the projection screen with non-visible infrared radiation. An infrared sensitive camera, also close to the video projector, observes the projection screen and sees only the uniform infrared illumination of the screen. Upon entry of a subject into the projected video image, the infrared reflected from the subject will not match that of the projection screen and thus the subject area is identified. All pixels of the projected scene, in the area occupied by the subject, are inhibited before reaching the video projector. The subject may then look directly at an audience without being blinded by the projector.

24 Claims, 2 Drawing Sheets

METHOD AND APPARATUS FOR INHIBITING PROJECTION OF SELECTED AREAS OF A PROJECTED IMAGE

BACKGROUND OF THE INVENTION

On a relatively small screen, in a conference room or classroom, the speaker easily points to areas on the screen with the aid of a pointer stick. The use of larger projection screens requires the speaker to use a laser pointer or to advance into the projected scene to point to various elements.

Many a speaker having entered into the scene would like to turn and look directly at his audience as he speaks. Unfortunately, being in the projection beam, he is blinded by the projector and cannot see his audience. Furthermore, the scene with its text and graphics, is projected onto the speaker, which is quite distracting to an audience.

BRIEF SUMMARY OF THE INVENTION

A video projector shows the desired scene on a projection screen. An infrared source close to the video projector uniformly floods the projection screen with non-visible infrared radiation. An infrared sensitive camera, also close to the video projector, observes the projection screen and sees only the uniform infrared illumination of the screen. Upon entry of a subject into the projected video image, the infrared reflected from the subject will not match that of the projection screen and thus the subject area is identified. All pixels of the projected scene, in the area occupied by the subject, are inhibited before reaching the video projector. The subject may then look directly at an audience without being blinded by the projector.

DETAILED DESCRIPTION OF THE INVENTION

Figure 1:
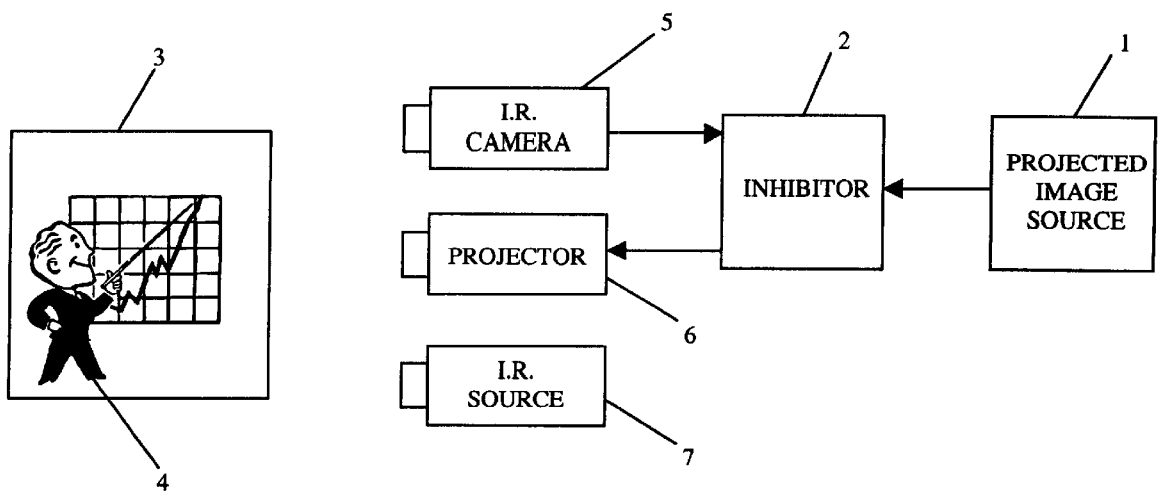
FIG. 1 shows a block diagram of the components comprising this invention.

Item 1 of FIG. 1 represents the source of video image to be projected onto projection screen 3. Item 1 may be a computer, videocassette, digital videodisc, another camera or other source of video image.

The video program signal from image source 1 is connected to inhibitor 2 where the video signal at selected pixels may be inhibited. The program signal is then connected from inhibitor 2 to video projector 6, which projects the program image on projection screen 3.

In one embodiment, an infrared source 7 is used to uniformly illuminate projection screen 3. Being infrared, this illumination is not seen by the viewer. Camera 5 is an infrared sensitive video camera observing the uniformly illuminated projection screen. Camera 5 output is connected to video inhibitor 2. The infrared signal at inhibitor 2 from the projection screen is nulled to zero. In the event a subject 4 enters into the projection beam, the subject's infrared reflection is likely to be higher or lower than the uniform infrared luminance level of the projection screen. Any infrared deviation from the infrared signal level established for the projection screen represents the subject. The addresses of those detected pixels that identify the subject location are used to inhibit the video program signal at these same addresses.

There is always a possibility that some small area on the subject's wardrobe will reflect exactly the same amount of infrared as the screen. In this area, the inhibitor is fooled and the video signal is not inhibited. Such areas are of little concern since there is little probability of infrared reflection from the subject's face matching that of the screen.

The probability of deceiving the inhibit logic is reduced by selecting the infrared camera's pass band least likely to match the reflection levels of the subject.

The near infrared bandwidth is very wide, and the infrared provided by an incandescent source provides a flat wide illumination bandwidth. The infrared sensitive camera may therefore be equipped with filters of adjoining pass bands such as 700–800, 800–900, and 900–1000 nanometers. It takes only a small shift in the pass band to effect a large change in infrared reflection. A filter selection may be made during setup to prevent the subject's infrared reflection from matching that of the screen.

An alternative to selecting external pass band camera filters is to incorporate two or more infrared image channels in the camera, each filtered to a different pass band, with a separate infrared reference frame stored for each pass band.

It is highly unlikely the subject's infrared reflection would simultaneously match the infrared reflection of two or more infrared pass bands.

Options

The objective of this invention is to inhibit the projected image from falling upon the subject when the subject enters into the projected image. It is therefore necessary to separate the subject from the scene being projected upon it.

There are several existing ways of detecting a subject's location. A standard difference key, or matte, relies on a reference frame of the blank screen to compare with each succeeding frame to detect the subject's location. Since an image within the visible spectrum is also being projected onto the screen, a standard difference key does not appear to function in this application.

Another option is to flood the projection screen with one or more bands of ultra violet light outside visible wavelengths.

One might also separate the subject from the projection screen by using a long wave infrared camera sensitive to the temperature of the human body. Since a camera of this type sees body temperature, there is no need to flood the screen with long wave infrared.

Other methods identify the subject presence by radar or sonar techniques that detect a subject as being at a shorter distance than the screen.

Stereoscopic devices, and maximizing image detail, have been used in automatic cameras to determine distance. Any scheme that provides a signal separating the subject from the projected image may be used in this invention to inhibit the projected image in the area occupied by the subject.

Preferred Option

A preferred option, used in this invention, is the use of near infrared to illuminate the projection screen. The infrared luminance level of the projection screen may be monitored and the reference frame updated to compensate for line voltage changes to the infrared source. The updated reference frame permits improved subject detection when infrared differences are very small. By using the infrared portion of the radiation spectrum, the projected and detected infrared images are immune from projected image content changes.

Using infrared illumination to generate a difference or ratio matte provides a practical method of identifying those pixels occupied by a subject. Equations for generating suitable ratio and difference mattes for this purpose are as follows:

Ratio Matte

If IRo≦IRm

M=IRo/IRm

If IRo>IRm

M=IRm/IRo

If IRm=IRo=0

M=0

Difference Matte $$M=1-\{max[(IRo-IRm), (IRm-IRo)]\}$$

Where:

IRo=observed IR pixel value

IRm=stored IR pixel value (at the same location)

M=calculated matte value

Figure 2:
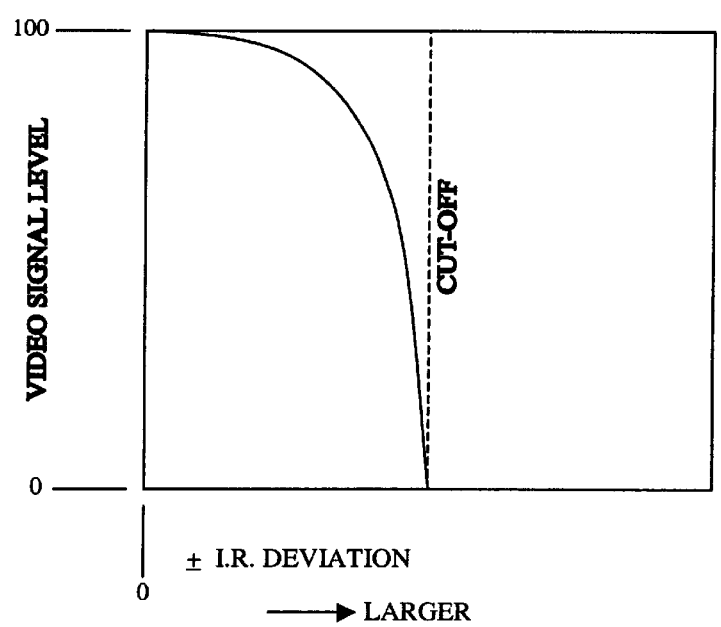
FIG. 2 is a curve showing the relationship between infrared deviation from that of the screen and the reduction of video signal.

Inhibiting of the projected image may be continuous, either linear or nonlinear, as opposed to a switch action. If nonlinear, the earliest and smallest detectable variance of the infrared signal is made to cause a small reduction of video signal level. As the deviation increases, the rate of inhibition increases. When the deviation nears a selected level, the inhibition rate is rapidly increased to cutoff, or to a selected low level near cutoff. The variable rate at which signal inhibition occurs prevents the on-off flicker effect of a switch action. FIG. 2 illustrates this relationship.

The term "inhibit" is defined as a reduction in the level of the projected image in that area occupied by the subject. In fact, if the level is reduced to about 5% of full level, the visibility of the subject is reduced to visual black. With little or no projector illumination onto the subject, it will receive no illumination other than ambient room light, which is typically attenuated to a very low level when using a projector.

Since subject illumination from the video projector has been inhibited to near zero, RGB levels representing white (or colored) light may be added to those pixels defining the subject area. The illumination of the subject may therefore be increased above that produced by ambient light alone. Although at a lower level, supplementary subject illumination augmenting ambient room light, is likely to be somewhat annoying to the subject facing the projector.

The techniques described in U.S. Pat. No. 5,270,820 may be used to locate the speaker's head (or other extremity). With this additional information, the projected white (or colored) light onto the subject may be inhibited in the region of his head and eyes.

The term "projection screen" or "screen" has been used above. This screen may be white, beaded, metallic, or metallic coated lenticular, or any surface suitable for viewing a projected image.

Implementation

In FIG. 1, item 1, the video program source may be a computer, videotape, or videodisc as selected by the user.

The video projector 6 and projection surface 3 are commercial devices selected by the user. An infrared filter, if needed, removes any residual infrared in the video projection beam.

The infrared sensitive camera 5 is a video camera whose photoreceptors extend into the near infrared beyond 700 nanometers. A filter is placed over the camera lens to remove visible wavelengths.

The infrared source 7 is a projector using an incandescent lamp. A filter is placed over the infrared source to remove visible light. Item 2 is the detector/inhibitor. Its function has been described earlier.

Figure 3:
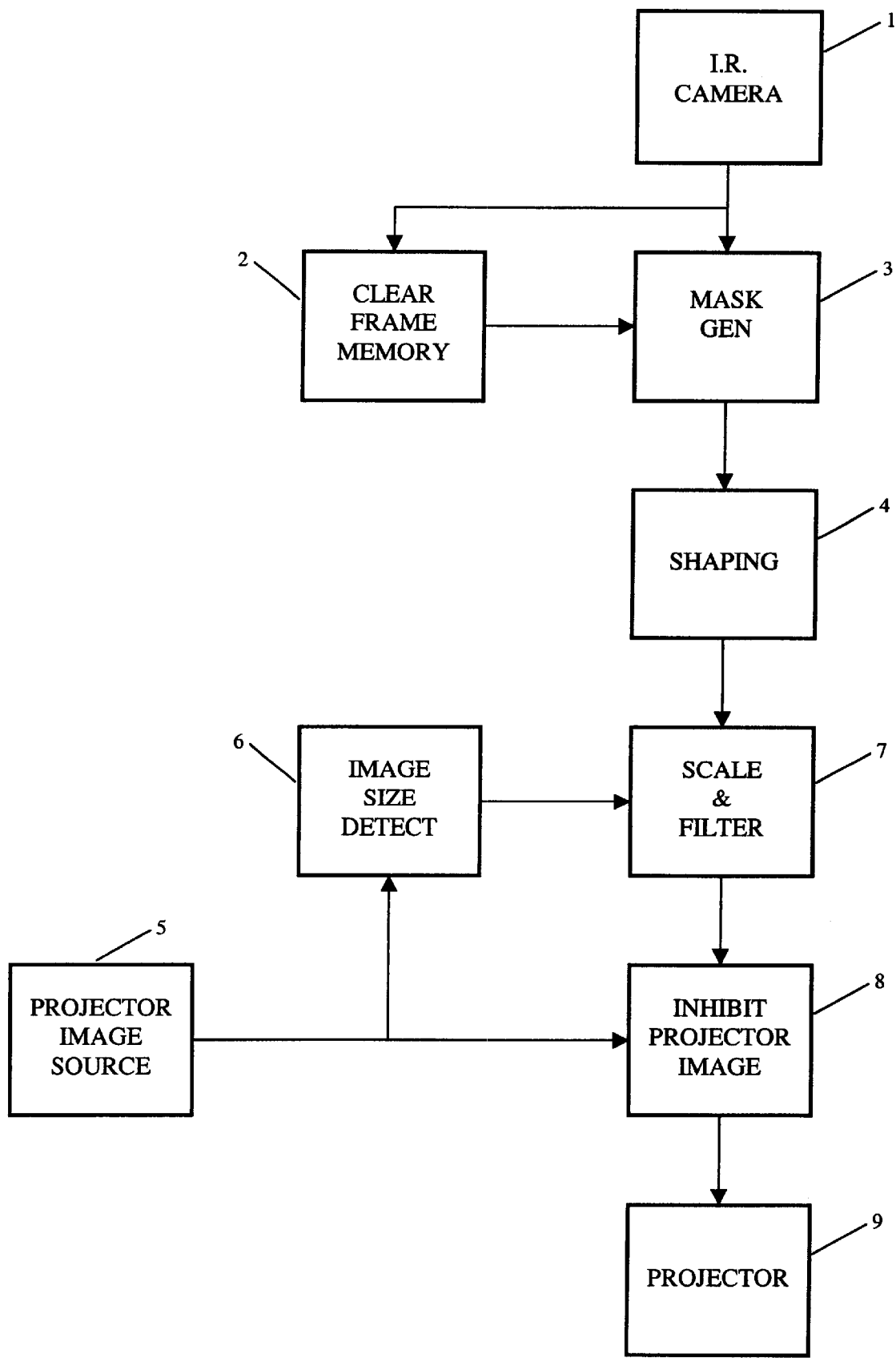
FIG. 3 is a logic diagram of the elements of an operational system.

FIG. 3 is a logic flow diagram showing the functions of subject detection and program signal inhibiting. Referring to FIG. 3, box 1 may be a 480 line VGA progressive scan low resolution camera, or any other low resolution camera sensitive to near infrared. Box 2 is a stored infrared image of the infrared illuminated screen with the subject removed from the scene. The mask generator 3 compares the infrared sensitive camera image with the clear frame image in memory 2 and any difference identifies that area occupied by a subject, if present. Box 4 shapes the subject detection signal from an on-off signal to a linear, or a nonlinear signal as shown in FIG. 2.

Box 5 is the program source to be projected onto the projection screen. The program video is generally an image of much higher resolution than an NTSC signal. Box 6 determines the resolution of the program image and connects this size data to box 7, which acts as a standards converter, to scale the size of the infrared camera to match the size of the projected image. Having matched image sizes, the program image is inhibited in box 8 in the area occupied by a subject, if a subject is present. Projector 9 projects program image onto the screen, but does not project the program onto the subject.

What is claimed is:

1. A method for inhibiting projection of a portion of an image being projected onto a projection screen when a subject enters a beam used to produce the projected image comprising the steps of:

a) identifying a portion of the projected image that would be intercepted by the subject entering said beam by a predetermined detection technique;

b) inhibiting the signal level of pixels in said portion, to reduce signal levels of the beam projected onto said subject.

2. A method for inhibiting projection of a portion of an image being projected onto a projection screen when a subject enters into a beam used to produce the projected image comprising the steps of:

a) uniformly illuminating said projection screen with infrared radiation from an infrared source, b) projecting a visible image onto said projection screen, c) capturing pixel signal levels produced by said infrared illuminated projection screen using an infrared sensitive camera, d) storing the captured signal levels as an infrared reference frame, e) comparing said signal levels in said reference frame with infrared sensitive signal levels of each image frame being projected and captured, f) identifying a pixel in said subject area as a pixel in the infrared sensitive camera image whose infrared signal level does not match said stored infrared signal level at a corresponding address in said infrared reference frame, g) inhibiting the signal levels of each pixel in the projected image whose address has been identified as being a subject address, thereby preventing the beam containing the projected image from being projected onto said subject.

3. The method of claim 1 in which said projection screen is one of a white wall, a matte white projection screen, a beaded screen, a metallic coated lenticular screen.

4. The method of claim 2 in which at least two infrared bands are employed, and said subject is detected if a mismatch occurs at a given pixel location between the new image frame signal levels and the stored reference frame signal levels, for any one of the at least two infrared bands.

5. The method of claim 2 in which the stored reference frame signal levels are updated at predetermined intervals to maintain a match between the infrared signals in the stored reference frame and the signal levels from the camera in areas of the screen without said subject to eliminate effects of line voltage variations.

6. The method of claim 1 in which said inhibit signal varies as one of a linear and nonlinear function of infrared deviation between said subject and said reference frame.

7. The method of claim 1 in which those pixels whose signal levels have been inhibited are provided by signal levels created by said inhibiting to provide one of colored and white light illumination of the subject.

8. The method of claim 7 in which said one of colored and white light illumination is inhibited from illuminating a face of the subject by determining a location of the subject's head.

9. The method of claims 2 in which said projection screen is one of a white wall, a matte white projection screen, a beaded screen, a metallic coated lenticular screen.

10. The method of claim 2 in which said inhibit signal varies as one of a linear and nonlinear function of infrared deviation between said subject and said reference frame.

11. The method of claim 2 in which those pixels whose signal levels have been inhibited are provided by signal levels created by said inhibiting to provide one of colored and white light illumination of the subject.

12. The method of claim 11 in which said one of colored and white light illumination is inhibited from illuminating a face of the subject by determining a location of the subject's head.

13. An apparatus for inhibiting projection of a portion of an image being projected onto a projection screen when a subject enters a beam used to produce the projected image comprising:
    a) means for identifying a portion of the projected image that would be intercepted by the subject entering said beam by a predetermined detection technique;
    b) means for inhibiting the signal level of pixels in said portion, to reduce signal levels of the beam projected onto said subject.

14. An apparatus for inhibiting projection of a portion of an image being projected onto a projection screen when a subject enters into a beam used to produce the projected image comprising:
    a) means for uniformly illuminating said projection screen with infrared radiation from an infrared source,
    b) means for projecting a visible image onto said projection screen,
    c) means for capturing pixel signal levels produced by said infrared illuminated projection screen using an infrared sensitive camera,
    d) means for storing the captured signal levels as an infrared reference frame,
    e) means for comparing said signal levels in said reference frame with infrared sensitive signal levels of each image frame being projected and captured,
    f) means for identifying a pixel in said subject area as a pixel in the infrared sensitive camera image whose infrared signal level does not match said stored infrared signal level at a corresponding address in said infrared reference frame,
    g) means for inhibiting the signal levels of each pixel in the projected image whose address has been identified as being a subject address, thereby preventing the beam containing the projected image from being projected onto said subject.

15. The apparatus of claims 13 in which said projection screen is one of a white wall, a matte white projection screen, a beaded screen, a metallic coated lenticular screen.

16. The apparatus of claim 14 in which at least two infrared bands are employed, and said subject is detected if a mismatch occurs at a given pixel location between the new image frame signal levels and the stored reference frame signal levels, for any one of the at least two infrared bands.

17. The apparatus of claim 14 in which the stored reference frame signal levels are updated at predetermined intervals to maintain a match between the infrared signals in the stored reference frame and the signal levels from the camera in areas of the screen without said subject to eliminate effects of line voltage variations.

18. The apparatus of claim 13 in which said inhibit signal varies as one of a linear and nonlinear function of infrared deviation between said subject and said reference frame.

19. The apparatus of claim 13 in which those pixels whose signal levels have been inhibited are provided by signal levels created by said inhibiting means to provide one of colored and white light illumination of the subject.

20. The apparatus of claim 19 in which said one of colored and white light illumination is inhibited from illuminating a face of the subject by determining a location of the subject's head.

21. The apparatus of claims 14 in which said projection screen is one of a white wall, a matte white projection screen, a beaded screen, a metallic coated lenticular screen.

22. The apparatus of claim 14 in which said inhibit signal varies as one of a linear and nonlinear function of infrared deviation between said subject and said reference frame.

23. The apparatus of claim 14 in which those pixels whose signal levels have been inhibited are provided by signal levels created by said inhibiting to provide one of colored and white light illumination of the subject.

24. The apparatus of claim 23 in which said one of colored and white light illumination is inhibited from illuminating a face of the subject by determining a location of the subject's head.

* * * * *